United States Patent Office 3,467,165
Patented Sept. 16, 1969

3,467,165
METHOD OF MAKING FOUNDRY MOLDS
Georgi S. Angeloff, Jordan Kiskinov-Str. 29,
Sofia, Bulgaria
No Drawing. Filed Oct. 22, 1965, Ser. No. 502,609
Int. Cl. B22c *1/02, 1/22*
U.S. Cl. 164—6          8 Claims

ABSTRACT OF THE DISCLOSURE

The method of manufacturing foundry molds or cores wherein a predetermined quantity of sand is mixed with a predetermined quantity of polystyrene foam particles. The latter particles are burned or gasified when molten metal is inserted in the mold thereby producing in said mold a desired degree of permeability.

---

This invention relates to foundry molds which are adapted to receive molten metals for shaping castings.

The molding mixtures for these molds generally comprise porous and/or granular materials such as ordinary sand, in order to provide for the permeation of gas through the mold during the casting process. It is generally accepted in the foundry art that it is desirable to increase the gas permeability of molding mixtures. Different methods, none completely satisfactory, have been used heretofore to improve the gas permeability of the mixtures. Thus it is known to admix combustible or volatile substances, such as coaldust, sawdust, etc., to the sand before forming the foundry molds. Since these admixed substances have relatively high specific gravities, the ratio between their quantities and the increase of gas permeability is not very favorable.

It is a principal object of this invention to provide an admixture to a mold made of granular material for increasing the permeability of the latter.

I have discovered that when adding some artificially produced foam particles to the sand which is customarily used in the production of casting molds and cores, the admixture will cause the permeability of the molds and cores to be considerably improved.

I have further discovered that foamed polystyrene is particularly well suited for this purpose. It should be noted that the specific gravities of artificially produced foam, and particularly of polystyrene foam, are very low when compared with the additives heretofore used for this purpose. Consequently, it is possible to produce by means of the addition of artificially produced foam to sand or other suitable granular substances, molding mixtures for molds or cores having improved gas permeability characteristics, and which at the same time have reduced specific gravities.

For example, molds and cores made out of mixture which comprises 15% by volume (about 0.3% by weight) of polystyrene foam (specific gravity about 20 kilograms per cubic meter), have a gas permeability several times higher than that of molds and cores prepared from the same mixture without the admixture of foam polystyrene.

It has been found, consequently, that particles of polystyrene foam are particularly well suited as an admixture for the above-described purposes. The polystyrene may be used in the form of beads of expanded polystyrene foam. In the event a fine finish for the mold surface is required, fine chips of polystyrene powder should be used.

When large-size molds and cores are manufactured, it has been found advantageous to prepare the molds and cores in separate layers, the mixture for each layer being formed with a different percentage of polystyrene additive. Thus the internal layer of the mold which forms the contact surface, should be made with the addition of a low content of fine particles of polystyrene foam. On the other hand, the outer layers of the molds or cores, which are spaced from the contact surfaces of the central portions, should advantageously contain an addition of a higher content of coarser-sized particles of polystyrene foam. In this manner, molds and cores with improved gas permeability characteristics can be produced. The molds and cores made of such mixtures have the additional advantage of being more pliant and therefore the castings are less subject to damage due to shrinkage. Furthermore, the aforedescribed molds and cores can be more easily knocked out, and the castings can, consequently, be more easily cleaned.

In one embodiment of my invention, the prepared cores and molds are dried in an oven which is heated to at least a temperature of 200° C. At this temperature, the particles of polystyrene foam melt, burn out or gasify, causing thus the desired porosity of the molds or cores.

In another embodiment of this invention, particles of artificially produced foam may be added to a molding mixture with binding substances, which cause hardening in the cold state. These types of molds require no heat treatment before pouring of the molten metal. The permeability of these types of molds is not significantly increased by the addition of particles of artificial foam. However, the addition of the artificial foam particles does facilitate greatly the knocking out of the molds and the cleaning of the castings.

It should further be noted that the hot crackings in even the most complicated castings can be eliminated by using the aforedescribed methods.

In particular, it should be noted that very good results had been achieved with molds and cores fabricated in separate layers, each of which has a different foam particles content. Similarly to the molds containing binding substances which harden in the cold state, the percentage of foam-particle additive is not limited by strength requirements over a wide percentage range.

Although preferred embodiments of the invention have been described, it will be understood that modifications may be made within the spirit and scope of the appended claims.

I claim:
1. A method of manufacturing foundry molds or cores, comprising the steps of mixing a predetermined quantity of mold sand and binder with a predetermined quantity of polystyrene foam particles, shaping said mixture into molds or cores, and thereafter burning said polystyrene foam particles, thereby producing in said foundry molds or cores a desired degree of gas permeability and casting shakeout.

2. The method of manufacturing foundry molds or cores, as set forth in claim 1, wherein said binder hardens in the cold state and wherein the burning of said polystyrene foam particles is effectuated by pouring molten metal into said molds or cores.

3. The foundry molds and cores produced from a molding mixture as set forth in claim 1, wherein said molds have at least two layers, each of said layers having a polystyrene foam-particle content different from that of the adjacent layer.

4. The foundry molds and cores as set forth in claim 3, wherein the layer forming the internal surface of said molds or cores has the lower percentage of polystyrene foam-particle content of said two layers.

5. The foundry molds and cores as set forth in claim 4, wherein the layer forming the internal surface of said molds or cores has the smaller polystyrene foam-particle size of said two layers.

6. A method of manufacturing foundry molds or cores, comprising the steps of mixing a predetermined quantity of mold sand and binder with a predetermined quantity of polystyrene foam particles, and thereafter gasifying said polystyrene foam particles, thereby producing in said foundry molds or cores a desired degree of gas permeability and casting shakeout.

7. The method of manufacturing foundry molds or cores, as set forth in claim 6 wherein said gasifying of said polystyrene foam particles is effectuated by pouring molten metal into said molds or cores.

8. The method of manufacturing foundry molds or cores, as set forth in claim 6, wherein said binder hardens in the cold state and wherein said gasifying of polystyrene foam particles is effectuated by pouring molten metal into said molds or cores.

References Cited

UNITED STATES PATENTS

| | | | |
|---|---|---|---|
| 3,021,291 | 2/1962 | Thiessen | 260—2.5 |
| 3,144,346 | 8/1964 | Dilnot | 264—45 X |
| 3,258,349 | 6/1966 | Scott. | |
| 3,367,393 | 2/1968 | Lanahan et al. | 164—34 |
| 3,362,463 | 1/1968 | Manginelli | 164—43 X |
| 2,830,343 | 4/1958 | Shroyer | 164—34 |
| 3,037,252 | 6/1962 | House et al. | 164—23 |
| 3,107,403 | 10/1963 | Moore | 164—16 |

J. SPENCER OVERHOLSER, Primary Examiner

ROBERT D. BALDWIN, Assistant Examiner

U.S. Cl. X.R.

164—43; 264—44